United States Patent [19]

Takematsu

[11] 4,354,141
[45] Oct. 12, 1982

[54] ELECTRIC FLASH DEVICE FOR CAMERA
[75] Inventor: Yoshiyuki Takematsu, Tokyo, Japan
[73] Assignee: Fuji Koeki Corporation, Tokyo, Japan
[21] Appl. No.: 161,418
[22] Filed: Jun. 20, 1980
[30] Foreign Application Priority Data Jun. 22, 1979 [JP] Japan ............... 54-078013

[51] Int. Cl.³ ............................ H05B 41/32
[52] U.S. Cl. ................ 315/241 P; 250/214 SF; 315/152; 315/155; 354/132; 354/145
[58] Field of Search ............ 315/151, 152, 155, 159, 315/241 P; 250/214 P, 214 SF; 354/31, 33, 131, 132, 145

[56] References Cited
U.S. PATENT DOCUMENTS 3,980,923 9/1976 Schneider ............ 315/241 P
4,049,996 9/1977 Vital et al. ............ 250/214 SF

FOREIGN PATENT DOCUMENTS 53-59827 3/1978 Japan .
53-147136 6/1978 Japan .

Primary Examiner—Eugene R. La Roche
Attorney, Agent, or Firm—Fleit & Jacobson

[57] ABSTRACT

An electric flash device for camera of the present invention comprises, substantially, a first flash unit incorporated into a camera, and a second flash unit operated associating with the flash operation of the first flash unit, said second flash unit comprises flash starting means for starting a flash operation of a flash tube by means of receiving a flash light from said first flash unit. The electric flash device of the present invention further comprises means for eliminating or reducing flash light quantity of said flash tube of said second flash unit.

16 Claims, 9 Drawing Figures

ELECTRIC FLASH DEVICE FOR CAMERA

FIELD OF THE INVENTION

The present invention relates to an electric flash device, and more particularly to an electric flash device for a camera which is enabled to take photographs from long distance and the nearest distance by means of mounting another flash device on a camera which incorporates a flash device.

BACKGROUND OF THE INVENTION

In recent years, a camera incorporating a flash unit has been widely employed. The camera in which the flash unit is incorporated can, however, perform flash photographing in only near distance such as within 5 m and at film speed ASA 100, since the flash light quantity of the incorporated flash unit is relatively small. Accordingly, under exposure is inevitable in the case of photographing in the long distance which is longer than 5 m.

To alleviate these disadvantages a flash arrangement having a flash unit incorporated into the camera and another flash unit mounted outwardly on the camera is employed. The second flash unit is electrically connected to the first flash unit by a synchro-cord, and is made synchronous with the flash operation. In such flash arrangement, a circuit and exposure mechanism are designed so as to be able to take a flash photograph in accordance with the performance of the flash unit incorporating the camera. The mounted flash unit does not have any contact for the second flash unit, and, therefore, it is impossible to flash by using the synchro-cord. Accordingly, it is necessary to improve the arrangement by incorporating an inner circuit and an exposure mechanism and the like of the flash device into the camera or to provide an electric circuit and an exposure mechanism in the camera separately.

SUMMARY OF THE INVENTION

It is, accordingly, an object of the present invention to provide an electric flash device for a camera which has good performance in photographing.

According to the present invention there is provided an electric flash apparatus comprising a first flash unit including a first flash member, a second flash unit including a second flash member having a flash tube, and flash control circuit means for controlling the flash operation of said second flash member, said flash control circuit means comprising a power source circuit, an electric charge storing circuit for storing an electric charge from said power source circuit, trigger pulse generating means for triggering said second flash tube of the second flash unit, and flash light control means actuated by the flash operation of said first flash unit.

BRIEF DESCRIPTION OF THE DRAWINGS

The other objects and features of the present invention will be best understood by the description of the preferred embodiments from the following description of specific embodiments when read in connection with the accompanying drawings.

DESCRIPTION OF THE PREFERRED EMBODIMENTS

Figure 1:
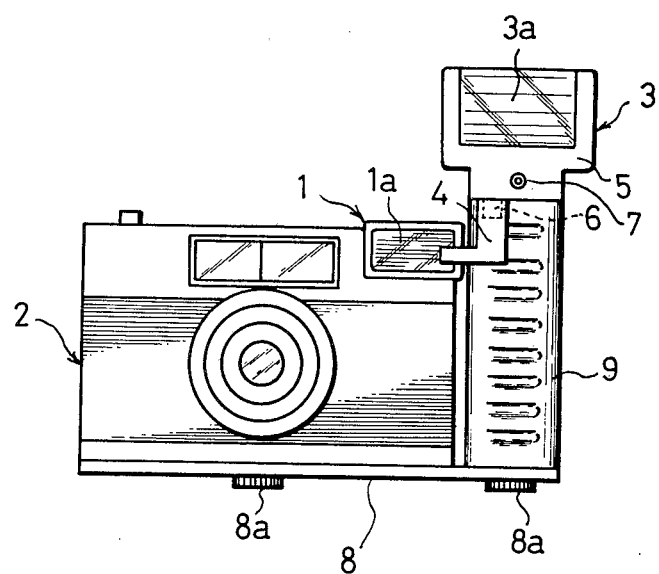
FIG. 1 is a front view of a camera employing the present invention.

Referring to FIG. 1 of the drawings, there is shown, greatly simplified, an electric flash device according to the present invention. The electric flash device has a first flash unit 1 incorporated in a camera 2 and consisting of a first flash member 1a, and a second flash unit 3 consisting of a second flash member 3a communicated with the first flash member 1a by way of a light guide 4. The second flash unit 3 further includes a light sensitive member 6 for starting the flash operation of the second flash unit 3a and a light sensitive element 7 for adjusting the quantity of flash light. The light sensitive member 6 is provided in the light guide 4 and, on the other hand, the light sensitive element 7 is accommodated in a casing 5 of the second flash unit 3.

As is shown in FIG. 1, the second flash unit 3 is accommodated in the camera 2 by way of a bracket 8 and a grip 9 and is fastened to a bottom portion of the camera 2 by screws 8a. A light injection hole of the light guide 4 is located in a front portion of the first flash unit 1 which is incorporated in the camera 2. Accordingly, light generated from the first flash member 1a of the first flash unit 1 is emitted into the light sensitive member 6 provided in the light guide 4. By the light receiving operation of the light sensitive member 6, the second flash unit 3 is activated as will be described hereinbelow. In this case, it is not always necessary to provide the light guide 4, because the sensitivity of the solar cell 6a is high and the second flash unit 3 can by fully operated by a reflected light from the object to be photographed. Flash control circuit arrangements are accommodated in the first flash unit 1 and the second flash unit 3, respectively.

Figure 2:
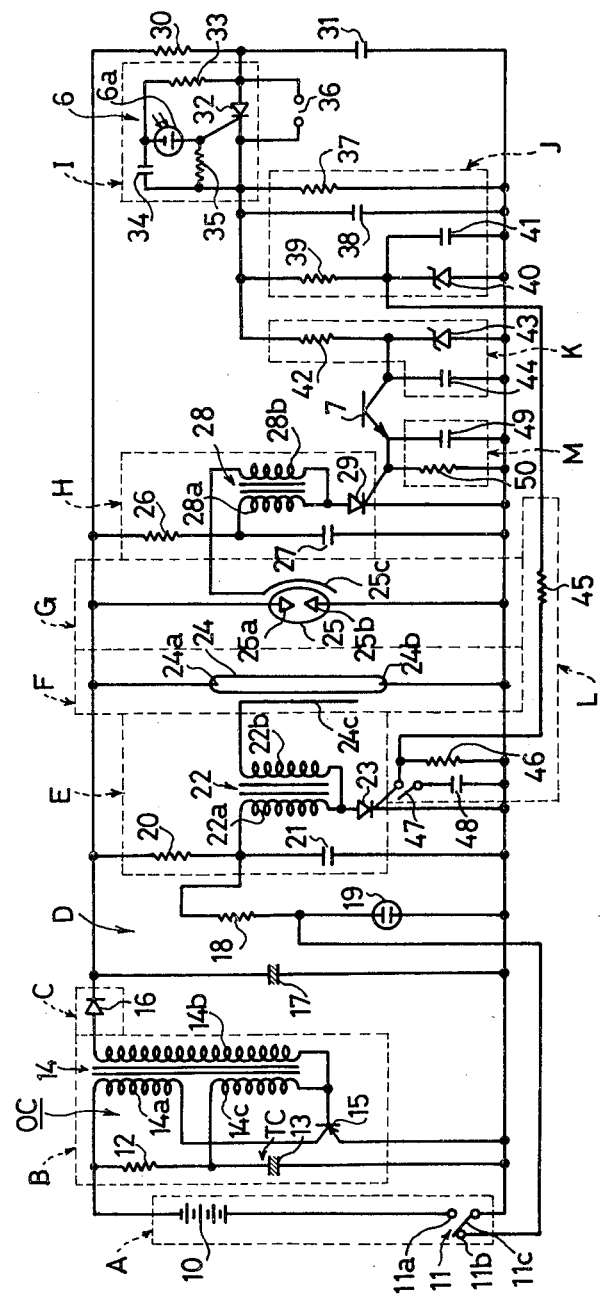
FIG. 2 is a detailed circuit diagram of a control circuit arrangement of an electric flash device according to the present invention.

FIG. 2 shows a flash control circuit arrangement of the second flash unit 3. The flash control circuit arrangement shown comprises a direct current power source circuit A, a voltage converter circuit B for converting and boosting a direct current voltage from the direct current power source circuit A to an alternating current voltage, a rectifier circuit C for rectifying the alternating current voltage from the voltage converter circuit B, an electric charge storing circuit D for supplying the electrical energy to a flash member, trigger pulse generating means for triggering flash light tubes, a flash tube circuit F for generating flash light, and a quench tube circuit G for quenching the flash tube circuit 7. The trigger pulse generating means consists of a first trigger pulse generating circuit E for triggering the flash tube circuit F, and a second trigger pulse generating circuit H for triggering the quench tube circuit G.

The second flash unit 3 further comprises flash light control means actuated by the flash operation of the first flash unit 1. The flash light control means comprises a flash starting circuit I sensing the flash light from the first flash unit 1 and actuating its operation, a constant voltage generating means for maintaining voltage generated from the flash starting circuit I to constant voltage, and a flash light quantity control means for controlling the quantity of flash light produced from the flash tube circuit F.

The constant voltage generating means of the flash light control means includes a first constant voltage generating circuit J and a second constant voltage generating circuit K. The flash light quantity control means of the flash light control means includes a first flash timing control circuit L for adjusting an operating time interval of the flash tube circuit F, and a second flash timing control circuit M for adjusting an operation time interval of the quench tube circuit G.

In more detail, the power source circuit A includes a battery 10 and a manually operated changeover switch 11 connected in series with the battery 10. The voltage converter circuit B comprises, substantially, an oscillator circuit OC and an oscillation time constant circuit TC. More specifically, the voltage converter circuit B includes a resistor 12 of which one terminal is directly connected to the negative terminal of the battery 10, a capacitor 13 of which one terminal is connected to the other terminal of the resistor 12 to form the oscillation time constant circuit TC, an oscillating transformer 14, and an oscillation switching element in the form of a transistor 15. The oscillating transformer 14 consists of a primary winding 14a, a secondary winding 14b and a third winding 14c. One terminal of the primary winding is directly connected to the negative terminal of the battery 10, and the other terminal of the primary winding 14a is connected to a collector electrode of the transistor 15 in order to form the oscillator circuit OC. One terminal of the secondary winding 14b is connected to a base electrode of the transistor 15. The rectifier circuit C comprises an electric valve in the form of a diode 16 of which an anode electrode is connected to a terminal of the secondary winding 14b of the oscillating transformer 14. The electric charge storing circuit D comprises a main storage capacitor 17, and an indicating lamp in the form of a neon glow lamp 19 for indicating the charging of the electric charge on the main storage capacitor 17. The main storage capacitor 17 is connected to a cathode electrode of the diode 16 of the rectifier circuit C.

The first trigger pulse generating circuit E includes a trigger resistor 20, a switching element in the form of a first thyristor 23, a trigger capacitor 21 and a first trigger transformer 22. In the first trigger pulse generating circuit E, one terminal of the trigger resistor 20 is connected to a negative terminal of the diode 16. One terminal of the trigger capacitor 21 is connected to the other terminal of the trigger resistor 20, and an input winding 22a of the trigger transformer 22 is connected to the other terminal of the trigger capacitor 21. The first thyristor 23 is connected to the input winding 22a and to the output winding 22b in series relationship by way of the trigger capacitor 21.

The flash tube circuit F includes a flash tube 24. The flash tube 24 is provided with a pair of main current conducting electrodes 24a, 24b and a trigger electrode 24c which is positioned adjacent but external to the flash tube 24. The flash tube 24 is arranged in a front surface of the second flash member 3a as shown in FIG. 1. One main current conducting electrode 24a is connected to the cathode electrode of the diode 16.

The quenching circuit G includes a quench tube 25 for quenching the flash tube 24. The quench tube 25 is also connected to both electrodes of the main storage capacitor 17.

There are, of course, certain criteria that must be met in quench tube 25. To operate effectively, the quench tube 25 must have a low impedance compared with the flash tube 24. The flash tube 24 has a minimum impedance of typically 1.5 to 2 ohms. Thus, the quench tube 25 should have an impedance near 0.1 ohm. To provide such low impedance, the quench tube 25 also should have a low gas pressure and a small electrode spacing. The electrodes 24a and 24b must be capable of carrying a very high current for short time. The quench tube 25 must be capable of being triggered rapidly and easily into conduction over the range of voltage change across the flash tube during the flash. The quench tube 25 includes a trigger electrode 25c spaced midway between the two main electrodes 25a and 25b.

In the flash starting circuit I, the light sensitive member 6 comprises a light sensitive element in the form of a solar battery 6, a second switching element in the form of a second thyristor 32 of which an anode electrode is connected to the cathode electrode of the diode of the rectifier circuit C by way of a charging resistor 30, a charging capacitor 31 connected between a juncture of the third thyristor 32 and the resistor 30 and the negative terminal of the battery 10 by way of the changeover switch 11. The sensitive member 6 further comprises a resistor 33 connected between the anode electrode and a gate electrode of the third thyristor 32 across the solar battery 6a, a gate capacitor 34 connected between the gate electrode and a cathode electrode of the third thyristor 32 by way of the solar battery 6a, and a gate resistor 35 connected between the gate electrode and the cathode electrode of the third thyristor 32.

The first constant voltage generating circuit J of the constant voltage generating means comprises a resistor 37 connected between the cathode electrode of the third thyristor 32 and the charging capacitor 31, a capacitor 38 connected in parallel to the resistor 37, a first constant voltage generating element in the form of a Zener diode 40 having a parallel resistor 41.

The second constant voltage generating circuit K of the constant voltage generating means comprises a resistor 42 of which one terminal is connected to the cathode electrode of the third thyristor 32, a second constant voltage generating element in the form of a Zener diode is connected to the cathode electrode of the third thyristor 32 by way of the resistor 42, and a capacitor 44 is connected in parallel to the diode 43.

The first flash timing control circuit L of the flash light control means comprises a resistor 45 connected between the first constant voltage generating circuit J and a control electrode in the form of a gate electrode of the first thyristor 23, a gate resistor 46 which is connected between the gate electrode and a cathode electrode of the first thyristor 23, a flash timing adjusting switch in the form of a manually operated mechanical switch having a stationary contact and a movable switch and juxtaposed in the gate electrode of the first thyristor 23, and a timing capacitor 48 connected between the gate electrode and the cathode electrode of the first thyristor 23 by way of the switch 47. A first integration circuit is formed by the resistor 45 and the capacitor 48.

The second flash timing control circuit M of the flash light control means comprises a light sensitive element in the form of a photocell 7 which is provided on a front surface of the casing of the second flash member 3a of the second flash unit 3 as is shown in FIG. 1, a timing capacitor 49 and a gate resistor 50 of the second thyristor 29. In more detail, a collector electrode of the photocell 7 is connected to the cathode electrode of the third thyristor 32, and an emitter electrode of the photocell 7 is connected to a gate electrode of the second thyristor 29. One terminal of the timing capacitor 49 is connected between a juncture of the emitter electrode of the photocell 7 and the gate electrode of the second thyristor 29, and the other terminal of the timing capacitor 49 is connected to the cathode electrode of the second thyristor 29. The second integration circuit is formed by the timing capacitor 49 and the gate resistor 50.

An electric flash device constructed foregoing description operates as follows.

When the power source switch 11 is closed, namely, when the movable contact 11c is connected to the stationary contact 11a of the changeover switch 11, the voltage converter circuit B activates an oscillating operation, and thereby the high voltage is induced at the secondary winding 14b of the oscillating transformer 14. The boosted alternating current voltage is rectified by the rectifier circuit C, and thereafter electric charge is stored on the main storage capacitor 17. When the main storage capacitor 17 is changed to the predetermined voltage, the neon glow lamp 19 lights indicating that the device is in readiness for the flash tube 24 to be fired. Simultaneously, the triggering capacitors 21 and 27 are charged by the high D.C. voltage from the rectifier circuit C. In such conditions, the operation of the flash tube member is initiated by the flash operation of the first flash unit 1 in synchronism with the camera shutter opening operation, enabling the flash tube to be flashed.

Namely, when the first flash unit 1 operates and generates the flash light, the solar battery 6a senses the flash light and generates the electro-motive force, and thereby a gating signal is supplied from the solar battery to the gate electrode of the third thyristor 32. By the application of the gating signal to the third thyristor 32, the third thyristor 32 becomes conductive. By the conduction of the third thyristor, voltage is applied to the first voltage constant voltage generating circuit J and the second voltage generating circuit K from the charging capacitor 31, and thereafter the constant voltages are applied to the gate electrodes of the first thyristor 23 and the second thyristor 29 by way of the first flash timing control circuit L and the second flash timing control circuit M. In the first flash timing control circuit L, an electric charge is stored on the timing capacitor 48 after the time interval decided by the time constant value of the resistor 45 and the capacitor 47, when the switch 47 is closed. The first thyristor 23 is triggered by the charging voltage of the timing capacitor 47, and thereby is made conductive after the above described time interval. When the first thyristor 23 becomes conductive, the electric charge discharges from the trigger capacitor 21 of the first trigger pulse generating circuit E by way of the input winding 22a and the first thyristor 23. By the discharging current of the trigger capacitor 21, a triggering pulse is induced at the output winding of the first triggering transformer 22. The triggering pulse from the secondary winding 22b is applied to the trigger electrode 24c of the flash tube 24. By triggering the flash tube 24, the brilliant flash light is generated therefrom. When the trigger control switch 47 is opened, the gating signal is instantaneously applied to the gate electrode from the first constant voltage generating circuit J in synchronism with the flash operation of the first flash unit 1.

An electric charge is also stored on the timing capacitor 49 of the second flash timing control circuit M after the predetermined time interval decided by a time constant value of the second integration circuit, and thereby the second thyristor 29 is triggered by the charging voltage of the timing capacitor 49 to make the second thyristor conductive. By the conduction of the second thyristor 29, the electric charge of the trigger capacitor 27 is discharged by way of the input winding 28a of the second triggering transformer 28, and thereby a trigger pulse is induced at the output winding 28b. The trigger pulse is also applied to the trigger electrode 25c of the quench tube 25 of the quenching circuit G. By the application of the trigger pulse to the quench tube 25, the quench tube 25 becomes conductive, and a flash light of small quantity is also produced therefrom. By the conduction of the quench tube 25, the electric charge of the main storage capacitor 17 is discharged by way of the quench tube 25, and thereby the flash operation of the flash tube 24 is ceased.

A stationary contact 11b of the power source switch 11 is connected to one electrode plate of the trigger capacitor 21 of the first trigger pulse generating circuit E by way of the resistor 18 of the electric charge storing circuit D. The movable contact 11c of the power source switch 11 is directly connected to other electrode plate of the trigger capacitor 21, as is shown in FIG. 2. When the movable contact 11c is contacted with the stationary contact 11b, the electric charge of the trigger capacitor 21 of the first trigger pulse generating circuit E is bypassed by way of the resistor 18, the movable contact 11c and the stationary contact 11b. Accordingly, the first thyristor 23 cannot be conductive, and the flash tube 24 does not generate the flash light. The neon glow lamp 19 is short-circuited by the movable contact 11c and the movable contact 11b of the power source switch 11 and, therefore, the neon glow lamp 19 does not illuminate, since the voltage is not applied to the neon glow lamp 19.

According to the electric flash device for camera in accordance with the foregoing description, the solar battery 6a produces voltage when it receives the light produced from the first unit 1 through the light guide 4. The voltage is applied to the gate electrode of the third thyristor 32. By the application of trigger signal from the solar battery 6a, the third thyristor 32 is made become conductive by the produced signal from the solar battery 6a. When the third thyristor 32 becomes conductive, charged voltage of the capacitor 31 is to the trigger signal generating means by way of the first constant voltage generating circuit J and the second constant voltage generating circuit K. The constant voltage from the first constant voltage generating circuit J is applied to the first flash timing control circuit L and, at the same time, the constant voltage from the second constant voltage circuit K is applied to the second flash timing control circuit M.

The first timing control circuit L is connected to the first pulse generating circuit E, and the second trigger pulse generating circuit H is connected to the second pulse generating circuit H. The first trigger pulse generating circuit E activates the flash tube 24, and the second trigger pulse generating circuit H activates the quench tube 25 of which internal resistance is smaller than that of the flash tube 25.

Figure 3:
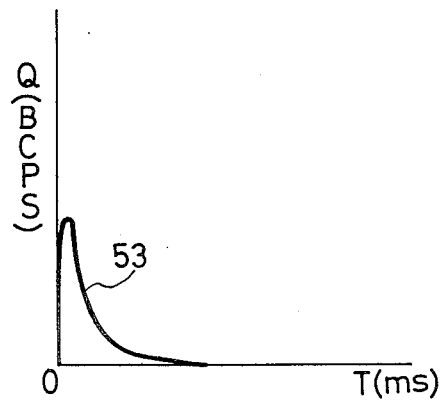
FIG. 3 is a graph showing the quantity of light produced from a first flash unit which is incorporated in a camera as measured against time.
Figure 4:
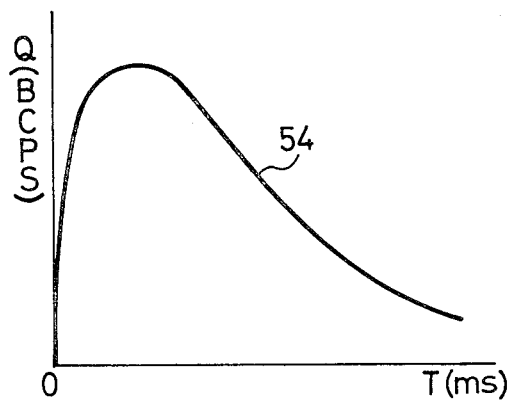
FIG. 4 is a graph showing the light quantity of light produced from a second flash unit of an electric flash device according to the present invention as measured against time.

It should be assumed that the flash light quantity of the flash tube of the first flash unit 1 is smaller than that of the flash tube 24 of the second flash unit 3 as is shown by a curve 53 of FIG. 3. The flash light quantity of the flash tube 24 is greater than that of the first flash unit, as shown by curve $l_2$ of FIG. 4. The camera is, generally, designed to be suitable flash light exposure in photographing in the small distance such as within 5 meters. In this case, the second flash unit 3 is designed such that it does not produce the flash light at all, or such that it produces the small quantity of flash light in order to avoid the over exposure.

In photographing through a small distance, the timing control switch 47 is usually made OFF and only the first flash unit 1 is activated to produce the flash light. The light sensitive element in the form of the solar battery 6a of the light sensitive member 6 senses the flash light from the first flash unit 1. The solar battery 6a generates the electro-motive force, and the third thyristor 32 of the light sensitive member 6 is made conductive. When the switch 47 of the first flash timing control circuit L is OFF state, the constant voltage from the first constant voltage generating circuit J is directly applied to the first trigger pulse generating circuit E as the gating signal of the first thyristor 23. The first thyristor 23 is instantaneously fired to be conductive. By the conduction of the first thyristor 23, the electric charge of the trigger capacitor 21 discharges through the input winding 22a of the triggering transformer 22, and thereby the trigger pulse produced from the output winding 22b to trigger the flash tube 24. By the triggering of the flash tube of the flash tube F, the flash tube 24 is operated to flash the flash light. The photocell 7 of the second flash timing control circuit M also senses the reflected light of the second flash unit 3 immediately after flash tube 24 produced the brilliant flash light, and, as a result, the second trigger pulse generating circuit H initiates the operation and makes the quench tube 25 to flash instantaneously.

Figure 5:
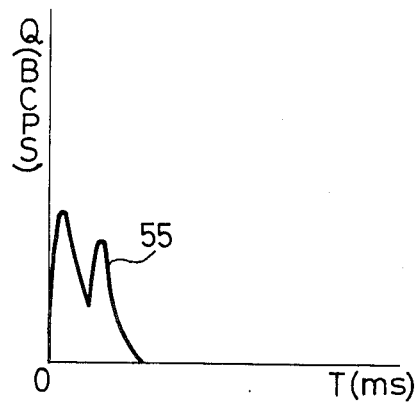
FIG. 5 is a graph showing the quantity of light and indicating the manner of operation of an electric flash device according to the present invention.

As mentioned earlier, the quantity of flash light of the flash tube 24 is set to be greater than that of the quench tube 25 by making the inner impedance of the flash tube 24 to be higher than that of the quench tube 25. Accordingly, the electric charge of the main storage capacitor 17 is mainly discharged through the quench tube 25 and, as a result, the flash tube 24 flashes instantaneously and ceases its flash operation. As the flash tube 24 flashes during very short time interval, the resultant flash light quantity of the first flash unit 1 and the second flash unit 3 is very small, as is shown by a curve 55 of FIG. 5. The second flash unit 3 may also be employed independent from the first flash unit 1 under the condition that the switch is made OFF and by connecting the terminal 36 to another camera which does not incorporate the flash device.

Figure 6:
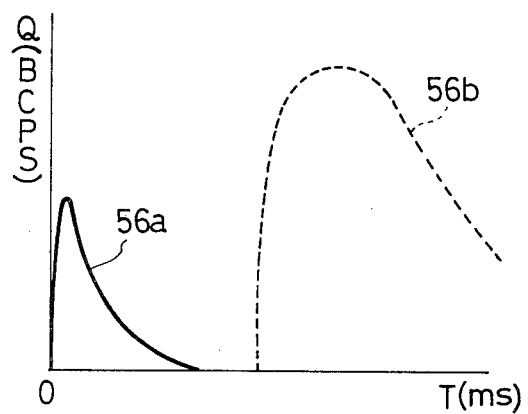
FIG. 6 is a graph showing the quantity of light and indicating another manner of operation of an electric flash device according to the present invention.

In case the timing control switch 47 is placed in the ON state and the first flash unit 1 is operated in order to take a photograph over a small distance, the flash tube 24 can not perform the flash operation due to the operation of the first flash timing control circuit L, since the first trigger pulse generating circuit can not be operated before the second trigger pulse generating circuit M does. Accordingly, the flash device produces only from the first flash unit 1 as is shown by a curve 56a of FIG. 6. Additionally, a curve 56b shown by a dotted line in FIG. 6 shows the flash operation of the second flash unit 3.

As is apparent from the above explanation, the flash photographing, over a small distance can be performed in spite of the OFF state and the ON state of the switch 47. When the switch 47 is ON, the flash timing of the second flash unit 3 is slightly delayed than that of the first flash unit 1, and thereby the second flash unit 3 can be accurately operated. There are, however, no deviation of flash timing between the first flash unit 1 and the second flash unit 3, even when the switch 47 is OFF. Further, the switch 47 must be rather in the OFF state in order to obtain synchronization of the flash, in case the second flash unit is independently employed from the first flash unit 1.

Figure 7:
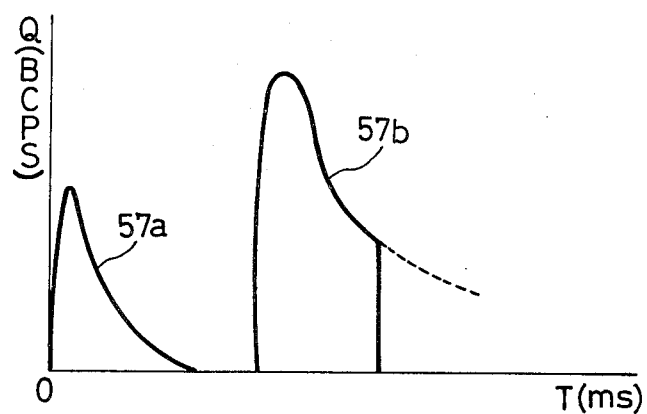
FIG. 7 is a graph showing the quantity of light and indicating a further manner of operation of an electric flash device according to the present invention.
Figure 8:
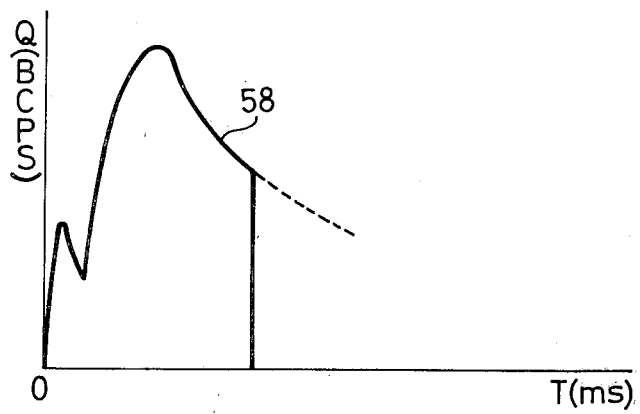
FIG. 8 is a graph showing the quantity of light and indicating a still further manner of operation of an electric flash device according to the present invention.

The photographing over the long distance can be performed in spite of the ON state and the OFF state of the switch 47. When the switch 47 is ON, the flash tube 24 initiates the flash operation after the predetermined time interval from the time when the first flash unit 1 flashes, because the application of the constant voltage of the first constant voltage generating circuit J is delayed by the first integration circuit. This delay time can be set freely by the time constant of the first integration circuit. FIG. 7 shows the resultant flash light quantity of the first flash unit 1 and the second flash unit 3, when the delay time it great. In FIG. 7, a curve 57a illustrates the flash light characteristic of the first flash unit 1, and a curve 57b shows the flash light characteristic of the second flash unit 3. Furthermore, a curve 58 of FIG. 8 shows the resultant flash light quantity of the first and the second flash units, when the delay time is short.

When the quantity of the flash light produced by flash tube 24 attains the predetermined value, a reflected light of the flash light generated from the flash tube 24 impinges on the photocell 7, and thereby the second thyristor 29 is made conductive. By the conduction of the second thyristor 29, the second trigger pulse generating circuit H is activated. By the activation of the second trigger pulse generating circuit H, the quench tube discharges in order to stop the flash operation of the flash tube 24. Accordingly the camera 2 performs the accurate exposure in both of the cases shown in FIGS. 7 and 8.

A time constant value of the second flash timing control circuit M is decided in accordance with an F value of a diaphragm, in photographing at the long distance. In the conventional camera incorporating a flash device, the F value is set 2.8 when the distance is 4–5 m, and therefore the second flash unit. The quantity of flash light of the second flash unit 3 may be adjusted by the F value. The flash device described above senses the exposure quantity and compensate it when the exposure quantity is inadequate.

Figure 9:
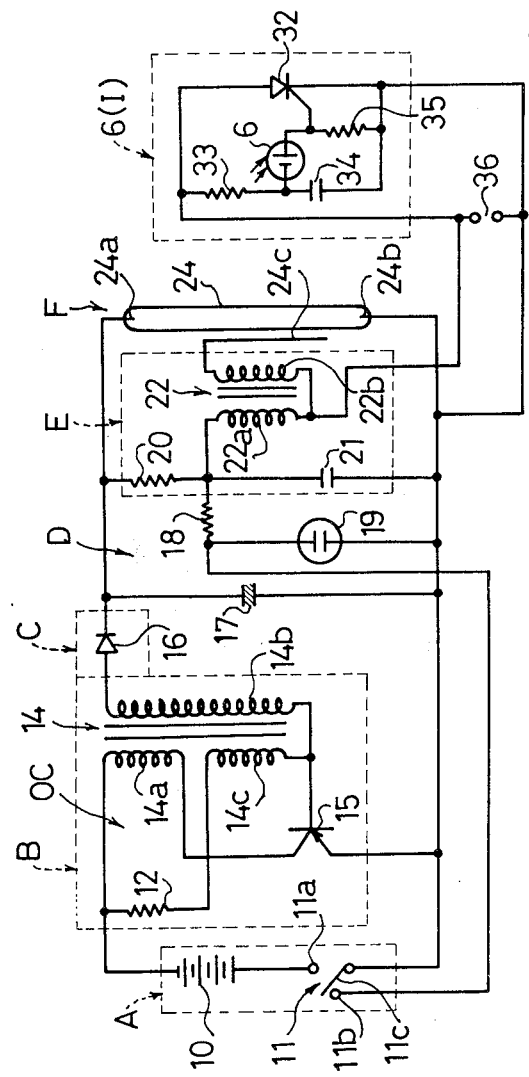
FIG. 9 is a detailed circuit diagram of a control circuit arrangement in accordance with the other embodiment of the present invention.

FIG. 9 illustrates another embodiment of the flash control circuit arrangement in accordance with the present invention. The device of this embodiment comprises a first flash unit and a second flash unit, the second flash unit, also, a direct current power source circuit A, a voltage converter circuit B for converting a direct current voltage, a rectifier circuit C for rectifying an alternating current voltage, an electric charge storing circuit D for supplying the electrical energy to a flash tube, a trigger pulse generating means including a first trigger pulse generating circuit E, and flash light control means actuated by the flash operation of the first flash unit 1. The flash light control means has a flash starting circuit I sensing the flash light from the first flash unit and actuating its operation. The flash starting circuit consists of a light sensitive member 6 which comprises a third thyristor 32, a solar battery 6a, a resistor, a capacitor 34 and a gating resistor 35, and connected as shown.

In the flash control circuit arrangement of FIG. 9, the trigger pulse generating means consists of only the first trigger pulse generating circuit E, and the flash light control means consists also of the flash starting circuit I. The flash starting circuit I is directly connected to the first trigger pulse generating circuit E.

The flash control circuit arrangement of FIG. 9 is provided with only the flash starting function for starting the flash operation of a flash tube 24, without providing flash timing control means and automatic light quantity adjusting means. Accordingly, a photographer can decide flash start timing of the second flash unit. Namely, when the photographer try to take photograph at the short distance, the second flash unit is made non-operating state by causing the power source switch 11 to be OFF, and the only first flash unit is activated. When the photographer, on the other hand, tries to take a photograph at a long distance, the second flash unit can be operated by synchronization with the flash operation of the first flash unit.

In accordance with the flash control circuit arrangement shown in FIG. 9, the circuit construction is very simple and, in addition to this, the flash timing is freely adjustable by the photograph.

In the flash device for camera according to the present invention, the light guide 4 shown in FIG. 1 is not always necessary, because it is provided so that the light sensitive member 6 senses only the flash light produced from the first flash unit which is accommodated in the camera. Accordingly, the light guide 4 may be provided between the first flash unit and the second flash unit so as to be detachable.

Further, each of intensities of the first flash unit and the second flash unit may be adjusted respectively by providing a light reducing cover the flashing surface of the first flash unit and/or the second flash unit in order to adjust the exposure of the camera.

Moreover, the flash device of the present invention can be used in a particular type of photography, such as in reflected flash light photography in a room or photostudio. In this case, the first flash unit is directed toward an object to be photographed. The second flash unit is set at a suitable angular orientation with respect to the first flash unit, and the second flash unit is directed toward a ceiling, in order to apply the bounced flash light to the object to be photographed and to eliminate shadow in a background of the object.

As is apparent from the foregoing description, the electric flash device for camera disclosed herein has the following advantages.

An advantage over the prior art flash apparatus is that the invention provides a new electric flash device for camera which can perform long distance photography, without providing any mechanical improvement to the conventional camera.

In view of above, it will be seen that the several objects of the invention are achieved and other advantageous results are attained.

While a preferred embodiment of the invention has been shown and described, it will be apparent to those skilled in the art that modifications can be made without departing from the principle and spirit of the invention, the scope of which is defined in the appended claims. Accordingly, the foregoing embodiments are to be considered illustrative, rather than restricting of the invention and those modifications which come within the meaning and range of equivalency of the claims are to be included herein.

What is claimed is:

1. An electric flash device for a camera comprising a first flash unit built into said camera, and having a first flashing member including a first flash tube, and a second flash unit mountable on said camera and having a second flashing member including a second flash tube, and a flash control circuit arrangement for controlling flash operation of said second flash unit in synchronization with the flashing operation of the first flash unit, said flash control circuit arrangement comprising a power source circuit for providing an electric charge, an electric charge storing circuit for storing said electric charge from said power source circuit, trigger signal generating means for triggering said second flash tube of the second flashing member, flash operation starting means activated by a flash light from said first flash unit and for activating said trigger signal generating circuit, and flashing operation selecting means for selectively setting the flash operation of said second flash tube of said second flash unit such that the second flash tube flashes when said first flash tube in the camera flashes.

2. An electric flash device for camera as claimed in claim 1, wherein said flashing operation selecting means selectively sets the flash operation of said second flash tube of the second flash unit such that the second flash tube does not flash when said first flash tube flashes.

3. An electric flash device for a camera as claimed in claim 1, further comprising flash timing control means for controlling operation timing of said trigger signal generating means.

4. An electric flash device for a camera as claimed in claim 3, wherein said trigger signal generating means comprises a first trigger signal generating circuit for triggering the second flash tube for producing a flash light.

5. An electric flash device for a camera as claimed in claim 4, further comprising a quenching circuit for quenching said second flash tube.

6. An electric flash device for a camera as claimed in claim 5, wherein said trigger signal generating means further comprises a second trigger signal generating circuit for triggering a quench tube of said quenching circuit.

7. An electric flash device for a camera as claimed in claim 6, wherein said flash timing control means comprises a first flash timing control circuit for controlling the trigger timing of the first trigger signal generating circuit, and a second flash timing control circuit for controlling the trigger timing of the second trigger signal generating circuit.

8. An electric flash device for a camera as claimed in claim 7, wherein said first flash timing control circuit includes a first constant voltage generating circuit for generating a constant voltage to be applied to the first trigger signal generating circuit, and said second flash timing control circuit includes a second constant voltage generating circuit for generating a constant voltage to be supplied to the second trigger signal generating circuit.

9. An electric flash device for a camera as claimed in claim 7, wherein said flash operation starting means includes a light sensitive element, which supplies a signal in response to received light, and said first flash timing control circuit comprises a first integration circuit for integrating the signal supplied from the light sensitive element of the flash operation starting means, and said second flash timing control circuit comprises a second integration circuit for integrating a signal supplied from said light sensitive element of the flash operation starting means and for stopping the flash operation of the second flash tube.

10. An electric flash device for a camera as claimed in claim 7, wherein said second flash timing control circuit includes a light sensitive element for sensing a flash light produced from said first flash tube.

11. An electric flash device for a camera as claimed in claim 1, wherein said flash operation starting means comprises a flash starting circuit including a light sensitive member for sensing flash light produced from said first flash unit provided in said camera.

12. An electric flash device for a camera as claimed in claim 3, wherein said flash operation starting means comprises a charging capacitor for storing a charging voltage, a switching element for switching said charging voltage of said charging capacitor and, a solar battery for producing an electro-motive force to controlling said switching element.

13. An electric flash device for a camera as claimed in claim 1, wherein said power source circuit includes a power source switch for switching power source voltage ON and OFF, and for inhibiting the flash operation of said second flash tube.

14. An electric flash device for a camera as claimed in claim 1, further comprising a voltage converter circuit for converting a direct current voltage from said power source circuit to an alternating current voltage and, a rectifier circuit for rectifying the alternating current voltage from said voltage converter circuit to a direct current voltage.

15. An electric flash device for a camera as claimed in claim 14, wherein said trigger signal generating means includes a first trigger signal generating circuit for generating a trigger pulse, and a flash tube circuit connected to said second flash tube, and said flash operation starting means actuating said first trigger signal generating circuit to generate said trigger pulse, said flash tube circuit being responsive to said trigger pulse for flashing said second flash tube in synchronization with the flash operation of the first flash unit.

16. An electric flash device for a camera as claimed in claim 14, wherein said voltage converter circuit includes an oscillator circuit having an oscillating transformer, an oscillation switching element, and an oscillation time constant circuit.

* * * * *